US009822195B2

(12) United States Patent
Ruehmer et al.

(10) Patent No.: US 9,822,195 B2
(45) Date of Patent: Nov. 21, 2017

(54) PROCESS FOR PRODUCING DIENE POLYMERS

(75) Inventors: Thomas D. Ruehmer, Mansfield (DE); Sven Thiele, Halle (DE); Anke Schmudde, Teutschental-Lagenbogen (DE); Dieter Bellgardt, Halle (DE)

(73) Assignee: TRINSEO EUROPE GMBH, Horgen (CH)

( * ) Notice: Subject to any disclaimer, the term of this patent is extended or adjusted under 35 U.S.C. 154(b) by 4 days.

(21) Appl. No.: 14/376,723

(22) PCT Filed: Feb. 29, 2012

(86) PCT No.: PCT/EP2012/053426
§ 371 (c)(1),
(2), (4) Date: Jan. 12, 2015

(87) PCT Pub. No.: WO2013/127448
PCT Pub. Date: Sep. 6, 2013

(65) Prior Publication Data
US 2015/0210791 A1 Jul. 30, 2015

(51) Int. Cl.
*C08F 36/06* (2006.01)
*C08L 9/00* (2006.01)
*B60C 1/00* (2006.01)
*C08C 19/44* (2006.01)
*C08K 3/04* (2006.01)
*C08L 9/06* (2006.01)
*C08L 15/00* (2006.01)

(52) U.S. Cl.
CPC ............ *C08F 36/06* (2013.01); *B60C 1/0016* (2013.01); *B60C 1/0025* (2013.01); *C08C 19/44* (2013.01); *C08K 3/04* (2013.01); *C08L 9/00* (2013.01); *C08L 9/06* (2013.01); *C08L 15/00* (2013.01)

(58) Field of Classification Search
CPC .... C08F 36/06; C08L 9/00; C08L 9/06; C08L 15/00; C08K 3/04; C08C 19/44; B60C 1/0016; B60C 1/0025
See application file for complete search history.

(56) References Cited

U.S. PATENT DOCUMENTS

| | | | |
|---|---|---|---|
| 3,374,191 A | 3/1968 | Nutzel | |
| 5,428,119 A | 6/1995 | Knauf et al. | |
| 5,567,784 A | 10/1996 | Wieder et al. | |
| 7,879,952 B2 | 2/2011 | Luo et al. | |
| 8,664,344 B2 | 3/2014 | Viola et al. | |
| 2002/0137843 A1 | 9/2002 | Kwag et al. | |
| 2003/0187162 A1 | 10/2003 | Rachita et al. | |
| 2004/0102589 A1 | 5/2004 | Jang et al. | |
| 2005/0137338 A1 | 6/2005 | Halasa et al. | |
| 2005/0154156 A1* | 7/2005 | Karato ................ C08F 36/06 526/82 |
| 2007/0149717 A1 | 6/2007 | Luo et al. | |
| 2009/0156751 A1 | 6/2009 | Kwag et al. | |
| 2011/0112261 A1 | 5/2011 | Viola et al. | |
| 2011/0230624 A1 | 9/2011 | Kloppenburg et al. | |
| 2011/0269899 A1 | 11/2011 | Murakami et al. | |
| 2012/0208964 A1 | 8/2012 | Kloppenburg et al. | |

FOREIGN PATENT DOCUMENTS

| | | |
|---|---|---|
| EP | 0 652 240 | 5/1995 |
| EP | 0 801 078 A1 | 10/1997 |
| EP | 1 803 740 | 7/2007 |
| EP | 2130842 A1 | 12/2009 |
| JP | H8-208751 A | 8/1996 |
| JP | H10-036436 A | 2/1998 |
| JP | 2003-514078 A | 4/2003 |
| KR | 20040013253 | 2/2004 |
| TW | 201035136 A1 | 10/2010 |
| TW | 201129577 A1 | 9/2011 |
| WO | WO 01/34658 A1 | 5/2001 |
| WO | WO 2007/047943 A2 | 4/2007 |
| WO | WO 2008/156788 A2 | 12/2008 |
| WO | WO 2009/121516 | 10/2009 |

OTHER PUBLICATIONS

Notice of Reasons for Rejection with English translation for related Japanese Application No. 2014-559103, dated Dec. 15, 2015 (-- pages).
PCT/EP2012/053426 International Search Report dated Nov. 29, 2012 (3 pages).
PCT/EP2012/053426 Written Opinion dated Nov. 29, 2012 (3 pages).
Friebe, Lars, O. Nuyken, and W. Obrecht, "Neodymium-Based Ziegler/Natta Catalysts and their Application in Diene Polymerization," Advances in Polymer Science 204, Neodymium Based Ziegler Catalysts—Fundamental Chemistry. Verlag Berlin Heidelberg: Springer, 2006, pp. 61-68 and 147-148.

* cited by examiner

*Primary Examiner* — Catherine S Branch
(74) *Attorney, Agent, or Firm* — Eric D. Babych; Brinks Gilson & Lione

(57) ABSTRACT

The invention describes a process for producing a diene polymer, the process comprising the following steps in this order: i) polymerizing one or more diene monomers in the presence of a catalyst composition to give a reaction mixture; ii) adding to the reaction mixture one or more alkoxysilane compounds; iii) adding $S_2Cl_2$, $SCl_2$, $SOCl_2$, $S_2Br_2$, $SOBr_2$ or a mixture thereof to the reaction mixture; and iv) optionally adding a protic agent to the reaction mixture so as to deactivate the catalyst. The invention further includes polymers that are obtainable according to this process, as well as products including the polymer.

14 Claims, No Drawings

PROCESS FOR PRODUCING DIENE POLYMERS

This application claims priority to International Application No. PCT/EP2012/053426 filed Feb. 29, 2012; the entire contents of which is incorporated herein by reference.

The present invention relates to a process for producing diene polymers, in particular modified elastomeric polymers, such as rubber, in particular high cis polybutadiene, comprising the steps of polymerizing one or more diene monomers in the presence of a catalyst composition to give a reaction mixture followed by the addition of one or more alkoxysilane compounds and the subsequent addition of at least one thio compound. The present invention further relates to diene polymers that are obtainable according to the process described herein. In addition, products comprising the diene polymers are described. Products include cured polymers and formulations comprising cured polymers and a filler.

The preparation of polydienes on the basis of Ziegler-Natta catalysts is known, and corresponding polydienes including high cis polybutadiene find use in many applications, e.g. in tire tread compounds. Common processes yield polymers, such as for example, polybutadiene comprising cis-1,4-polybutadiene as major polymer fraction in commercial quality. However, such processes are associated with certain drawbacks including side reactions, including chain transfer reactions during polymerization, and the need for additives, e.g. processing aids after polymerization, particularly during (reactive mixing) formation of polymer-filler compositions. Also processing of the diene-polymers in the course of the polymer manufacturing process may be impaired. Often high polymer solution viscosities require reduction of the concentration of the polymer in solution. Furthermore, polymer properties such as for example undesired cold flow are observed and processing behavior is often insufficient.

Prior art attempts to address these problems by means of temperature control, the use of special catalyst components and addition of sulphur compounds. These processes, however, either lead to increased energy consumption during manufacture and conversion, inferior polymer properties or unpleasant odor. Thus, prior art efforts have been directed to alternative means. Especially, EP 0 707 017 A1 considers a process for producing diene rubbers by polymerization with Nd-catalysts. The process disclosed in this application adiabatically polymerizes dienes at temperatures of −20° C. to 150° C. in the presence of an inert organic solvent. The process comprises the step of converting the reaction mixture from reduced to atmospheric pressure followed by a treatment with disulfur dichloride, sulfur dichloride or thionyl chloride. The results obtained according to EP 0 707 017 A1 are still not satisfactory. In particular, polymers obtained according to this process still lack beneficial processing behaviors, and performance properties of products comprising these prior art polymers may also need to be improved.

It is thus an object of the present invention to provide an improved process for producing diene polymers which allows the preparation of polymers, in particular rubbers, with favorable processing behavior. In this context, a favorable processing behavior refers to an easy and fast mixing of the polymers in, e.g. rubber compound formulations including fillers. It is a further object of the invention to provide polymers which allow the preparation of products, such as tires, having good performance properties. Typical performance properties are related to hysteresis properties including tan delta values at 60° C. (as laboratory rolling resistance indicator), 0° C. (as wet grip indicator) and −10° C. (as ice grip indicator), but may also include abrasion and dynamic modulus. In this regard, it has been observed that linear high molecular weight diene polymers show a good balance in terms of rolling resistance, wet grip and abrasion resistance in cured rubber formulations comprising filler. Linear high molecular weight diene polymers, however, are associated with high polymer solution viscosities as compared to branched polymers of identical weight average molecular weight (Mw). Moreover, once solvent free, these linear polymers are more difficult to mix with fillers as compared to branched polymers.

Accordingly, there is a further need for polymers combining the positive aspects of branched and linear polymers. Particularly, it would be desirable to provide diene polymers with improved solution viscosities and improved processing characteristics when mixed with fillers without, or without significantly, impacting hysteresis and wear properties of cured rubber formulations comprising the polymer and the filler.

In a first aspect, the present invention therefore relates to a process for producing a diene polymer, the process comprising the following steps in this order:

i) Polymerizing one or more diene monomers in the presence of a catalyst composition to give a reaction mixture; wherein the catalyst composition comprises one or more of a carboxylate, an alkyl phosphate, an alkyl phosphite, an alcoholate, an amide and a hydrocarbyl compound of a rare earth element having an atomic number of 57 to 71 in the periodic table, and at least one activator compound, or a reaction product of the at least one activator compound and the carboxylate, alkyl phosphate, alkyl phosphite, alcoholate, amide and/or hydrocarbyl compound of the rare earth element;

ii) Adding to the reaction mixture one or more alkoxysilane compounds selected from the compounds represented by the following formulae (A1), (A2), (A3), (A4) and (A5):

$$((R^1O)_q(R^2)_rSi)_s \quad (A1)$$

wherein in formula (A1): Si is silicon and O is oxygen;
s is an integer selected from 1 and 2;
with the proviso that if s is 1, then q is an integer selected from 2, 3 and 4; r is an integer selected from 0, 1 and 2; and q+r=4;
and if s is 2, then q is an integer selected from 1, 2 and 3; r is an integer selected from 0, 1 and 2; and q+r=3;

$$((R^3O)_t(R^4)_uSi)_2O \quad (A2)$$

wherein in formula (A2): Si and O are as defined above;
t is an integer selected from 1, 2 and 3;
u is an integer selected from 0, 1 and 2;
and t+u=3;

$$(R^5O)_w(R^6)_xSi\text{—}R^7\text{—}S\text{—}SiR^8{}_3 \quad (A3)$$

wherein in formula (A3): Si and O are as defined above, and S is sulfur;
w is an integer selected from 2 and 3;
x is an integer selected from 0 and 1;
and w+x=3;

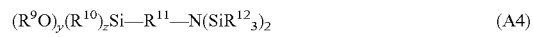
$$(R^9O)_y(R^{10})_zSi\text{—}R^{11}\text{—}N(SiR^{12}{}_3)_2 \quad (A4)$$

wherein in formula (A4): Si and O are as defined above, and N is nitrogen;

y is an integer selected from 2 and 3;
z is an integer selected from 0 and 1;
and y+z=3;

$$(Si(OR^{13})_3)_2(Si(OR^{14})_2)_p \qquad (A5)$$

wherein in formula (A5): Si and O are as defined above;
p is an integer selected from 1 to 10;
and wherein R1, R2, R3, R4, R5, R6, R8, R9, R10, R12, R13 and R14 in the above formulae (A1) to (A5) independently are selected from: (C6-C21) aryl, (C7-C22) alkylaryl and (C1-C16) alkyl; and R7 and R11 in formulae (A3) and (A4) independently are a divalent (C6-C21) aryl group, a divalent (C7-C22) alkylaryl group, or a divalent (C1-C16) alkylen group;

iii) Adding $S_2Cl_2$, $SCl_2$, $SOCl_2$, $S_2Br_2$, $SOBr_2$ or a mixture thereof to the reaction mixture; and iv) optionally adding a protic agent to the reaction mixture so as to deactivate the catalyst or other process components.

It has been found that carrying out the process in the order described above leads to a polymer, especially rubber, with superior properties in comparison to other polymers, especially rubbers, which are obtained in accordance with standard procedures. Improved properties include reduced solution viscosities as compared to linear diene polymers of similar molecular weight Mw. This allows for a better processing of the polymers in a polymer manufacturing plant. For example, the production throughput can be increased. Surprisingly, the process according to the invention provides polymers that show the above improvement without losing other desirable characteristics. In particular, surprisingly Mooney viscosities of polymer compositions obtained upon mixing the polymers according to the invention with fillers can be maintained at relatively low Mooney viscosity values as compared to Mooney viscosities of polymer compositions made by using state of the art polymers and fillers, provided Mooney viscosities of the compared polymers were in a similar range.

In a second aspect, the present invention thus relates to the diene polymers that are obtainable according to the process described herein. In a third aspect, the invention further addresses products comprising the diene polymer described above. Products include cured polymers and formulations comprising cured polymer and a filler.

The catalyst composition used in the process according to the invention may either comprise at least one compound of a rare earth element as well as an activator compound, wherein the at least one compound of the rare earth element (in the following also abbreviated as "rare earth element compound") is selected from carboxylates, alkyl phosphates, alkyl phosphites, alcoholates, amides and hydrocarbyls of a rare earth element having an atomic number of 57 to 71 in the periodic table. Or the catalyst composition may comprise a reaction product of the at least one activator compound and the at least one rare earth element compound.

The rare earth element in the rare earth element compound is preferably selected from neodymium, praseodymium, cerium, lanthanum, gadolinium and dysprosium or a combination thereof. In a more preferred embodiment, the rare earth element comprises neodymium.

The rare earth element compound can be selected from a wide variety of carboxylates, alkyl phosphates, alkyl phosphites, alcoholates, amides and hydrocarbyls. Preferred examples of carboxylates include octanoates (such as 2-ethyl-hexanoate), decanoates, naphtenates, versatate and neodecanoate. Preferred carboxylates include versatate and neodecanoate.

In a preferred embodiment, the rare earth element compound comprises neodymium versatate or neodymium neodecanoate, preferably neodymium (versatate)$_3$ or neodymium (neodecanoate)$_3$.

The activator compound of the catalyst composition as used in the present invention preferably comprises a Lewis acid. The Lewis acid can be chosen from a wide variety of Lewis acids, such as alkyl aluminum halides, alkyl chlorides, chlorosilanes and other metal chlorides. In a more preferred embodiment, the Lewis acid is an alkyl aluminum chloride or bromide selected from dialkyl aluminum chloride or bromide and alkyl aluminum dichloride or dibromide. Suitable examples of alkyl aluminum chlorides include diethyl aluminum chloride, ethyl aluminum sesquichloride, ethyl aluminum dichloride, as well as di-iso-butyl aluminum chloride, iso-butyl aluminum sesquichloride, iso-butyl aluminum dichloride, di-iso-propyl aluminum chloride, iso-propyl aluminum sesquichloride and iso-propyl aluminum dichloride. Examples of alkyl aluminum bromides include diethyl aluminum bromide, ethyl aluminum sesquibromide, ethyl aluminum dibromide, as well as di-iso-butyl aluminum bromide, iso-butyl aluminum sesquibromide, iso-butyl aluminum dibromide, di-iso-propyl aluminum bromide, iso-propyl aluminum sesquibromide and iso-propyl aluminum dibromide. In a particularly preferred embodiment, the Lewis acid is selected from diethyl aluminum chloride, ethyl aluminum sesquichloride, ethyl aluminum dichloride, iso-butyl aluminum chloride, iso-butyl aluminum sesquichloride, iso-butyl aluminum dichloride, di-iso-propyl aluminum chloride, iso-propyl aluminum sesquichloride and iso-propyl aluminum dichloride with diethyl aluminum chloride being particularly preferable.

Alkyl aluminum halides as activator compounds are typically used in an amount such that the ratio of the rare earth element compound/alkyl aluminum halide is of from 1:1 to 1:3 based on the molar amount of the rare earth element and the molar equivalents of halide. Preferably, this ratio is of from 1:2 to 1:3.

In a further preferred embodiment, the activator compound of the catalyst composition comprises one or more dialkyl aluminum hydrides according to general formula (A6) and at least one of the above Lewis acids:

$$R^{15}_2AlH \qquad (A6)$$

wherein both groups $R^{15}$ in formula (A6) are independently $C_{1-10}$ alkyl groups. Preferably, each $R^{15}$ is a $C_{2-6}$ alkyl group, more preferably a $C_{3-4}$ alkyl group. Particularly preferred examples of $R^{15}$ are iso-propyl and isobutyl.

The dialkyl aluminum hydride according to formula (A6) is typically used in an amount such that the molar ratio of the dialkyl aluminum hydride/rare earth element compound is of from 3:1 to 30:1, preferably of from 5:1 to 15:1.

Further activating compounds that may be used as an alternative to or in addition to the above at least one activator compound are combinations of neutral optional Lewis acids, especially the combination of a trialkyl aluminum compound having from 1 to 4 carbons in each alkyl group with one or more C1-30 hydrocarbyl-substituted Group 13 Lewis acid compounds, especially halogenated tri(hydrocarbyl) boron or -aluminum compounds having from 1 to 20 carbons in each hydrocarbyl group, especially tris(pentafluorophenyl)borane or tris(pentafluorophenyl)alumane, further combinations of such neutral Lewis acid mixtures with a polymeric or oligomeric alumoxane, and combinations of a single neutral Lewis acid, especially tris(pentafluorophenyl)borane or tris(pentafluorophenyl)alumane, with a polymeric or oligomeric alumoxane. A benefit according to the present invention is the discovery that the most efficient catalyst activation using such a combination of tris(pentafluorophenyl)borane/alumoxane mixture occurs at reduced levels of alumoxane. Preferred molar ratios of the metal complex:tris(pentafluorophenyl)borane:alumoxane are from 1:1:1 to 1:5:5, more preferably from 1:1:1.5 to 1:5:3. The surprising efficient use of lower levels of alumoxane with the present invention allows for the production of diene polymers with high catalytic efficiencies using less of the expensive alumoxane activator. Additionally, polymers with lower levels of aluminum residue, and hence greater clarity, are obtained.

Suitable ion-forming activator compounds useful as activators in one embodiment of the present invention comprise a cation which is a acid capable of donating a proton, and a compatible, non-coordinating or poorly coordinating anion. As used herein, the term "non-coordinating" means an anion or substance which either does not coordinate to the metal containing precursor complex and the catalytic derivative derived therefrom, or which is only weakly coordinated to such complexes thereby remaining sufficiently labile to be displaced by a Lewis base such as olefin monomer in a manner such that the polymerization may proceed. A non-coordinating anion specifically refers to an anion which when functioning as a charge-balancing anion in a cationic metal complex does not transfer an anionic substituent or fragment thereof to said cation thereby forming neutral complexes. "Compatible anions" are anions which are not degraded to neutrality when the initially formed complex decomposes and are non-interfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such activators may be represented by the following general formula:

(L*-H)+$d$Ad− wherein:
L* is a neutral Lewis base;
(L*-H)+ is a Brönsted acid;
Ad− is a noncoordinating, compatible anion having a charge of d−, and
d is an integer from I to 3.
More preferably Ad− corresponds to the formula:

[M*Q4]−;

wherein:
M* is boron or aluminum in the +3 formal oxidation state; and
Q independently each occurrence is selected from hydride, dialkylamido, halide, hydrocarbyl, halohydrocarbyl, halocarbyl, hydrocarbyloxide, hydrocarbyloxy substituted-hydrocarbyl, organometal substituted-hydrocarbyl, organometalloid substituted-hydrocarbyl, halohydrocarbyloxy, halohydrocarbyloxy substituted hydrocarbyl, halocarbyl-substituted hydrocarbyl, and halo-substituted silylhydrocarbyl radicals (including perhalogenated hydrocarbyl-, perhalogenated hydrocarbyloxy- and perhalogenated silythydrocarbyl radicals), said Q having up to 20 carbon atoms with the proviso that in not more than one occurrence is Q halide. Examples of suitable hydrocarbyloxide Q groups are disclosed in U.S. Pat. No. 5,296,433.

In a more preferred embodiment, d is one, that is, the counterion has a single negative charge and is A−. Activating cocatalysts comprising boron which are particularly useful in the preparation of catalysts of this invention may be represented by the following general formula:

(L*-H)+(BQ4)−;

wherein:
(L*-H)+ is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Even more preferably, Q is each occurrence a fluorinated aryl group, especially, a pentafluorophenyl or nonafluorobiphenyl group. Preferred BQ4-anions are methyltris(pentafluorophenyl)borate, tetrakis(pentafluorophenyl)borate or tetrakis(nonafluorobiphenyl)borate.

Illustrative, but not limiting, examples of boron compounds which may be used as an activating cocatalyst in the preparation of the improved catalysts of this invention are trisubstituted ammonium salts such as: trimethylammonium tetraphenylborate, tri(n-butyl)ammonium tetraphenylborate, methyldioctadecylammonium tetraphenylborate, triethylammonium tetraphenylborate, tripropylammonium tetraphenylborate, tri(n-butyl) ammonium tetraphenylborate, methyltetradecyloctadecylammonium tetraphenylborate, N,N-dimethylanilinium tetraphenylborate, N,N-diethylanilinium tetraphenylborate, N,N,-2,4,6-pentamethylanilinium)tetraphenylborate, N,N-dimethyl anilinium bis(7,8-dicarbundecaborate) cobaltate (III), trimethylammonium tetrakis(pentafluorophenyl)borate, methyldi(tetradecyl)ammonium tetrakis(pentafluorophenyl) borate, methyldi(octadecyl)ammonium tetrakis(pentafluorophenyl) borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N,2,4,6-pentamethylanilinium) tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl) borate, dimethyl(t-butyl) ammonium tetrakis(2,3,4,6-tetrafluorophenyl)borate, N,N-dimethylanilinium tetrakis(2,3,4,6-tetrafluorophenyl) borate, N,N-diethylanilinium tetrakis(2,3,4,6-tetrafluorophenyl) borate, and N,N,2,4,6-pentamethylanilinium) tetrakis-(2,3,4,6-tetrafluorophenyl)borate; dialkyl ammonium salts such as: di(octadecyl)ammonium tetrakis(pentafluorophenyl)borate, di(tetradecyl)ammonium tetrakis(pentafluorophenyl)borate, and dicyclohexylammonium tetrakis(pentafluorophenyl)borate; trisubstituted phosphonium salts such as: triphenylphosphonium tetrakis(pentafluorophenyl) borate, methyldi(octadecyl)phosphonium tetrakis(pentafluorophenyl) borate, and tris(2,6-dimethylphenyl)phosphonium tetrakis(pentafluorophenyl)borate.

Examples for tetrakis(pentafluorophenyl)borate salts are long chain alkyl mono- di- and trisubstituted ammonium complexes, especially C14-C20 alkyl ammonium complexes, especially methyldi(octadecyl) ammonium tetrakis (pentafluorophenyl)borate and methyldi (tetradecyl) ammonium tetrakis(pentafluorophenyl)borate, or mixtures including the same. Such mixtures include protonated ammonium cations derived from amines comprising two C14, C16 or C18 alkyl groups and one methyl group. Such amines are available from Witco Corp., under the trade name Kemamine™ T9701, and from Akzo-Nobel under the trade name Armeen™ M2HT.

Examples of the catalyst activators herein include the foregoing trihydrocarbylammonium-, especially, methylbis (tetradecyl)ammonium- or methylbis(octadecyl)ammonium-salts of: bis(tris(pentafluorophenyl)borane)imidazolide, bis(tris(pentafluorophenyl)borane)-2-undecylimidazolide, bis(tris(pentafluorophenyl)borane)-2-heptadecylimidazolide, bis(tris(pentafluorophenyl)borane)-4,5-bis(undecyl)imidazolide, bis(tris(pentafluorophenyl)borane)-4,5-bis(heptadecyl)imidazolide, bis(tris(pentafluorophenyl)borane)imidazolinide, bis(tris(pentafluorophenyl)borane)-2-undecylimidazolinide, bis(tris(pentafluorophenyl)borane)-2-heptadecylimidazolinide, bis(tris(pentafluorophenyl)borane)-4,5-bis(undecyl)imidazolinide, bis(tris(pentafluorophenyl)borane)-4,5-bis(heptadecyl)imidazolinide, bis(tris(pentafluorophenyl)borane)-5,6-dimethylbenzimidazolide, bis(tris(pentafluorophenyl)borane)-5,6-bis(undecyl)benzimidazolide, bis(tris(pentafluorophenyl)alumane)imidazolide, bis(tris(pentafluorophenyl)alumane)-2-undecylimidazolide, bis(tris(pentafluorophenyl)alumane)-2-heptadecylimidazolide, bis(tris(pentafluorophenyl)alumane)-4,5-bis(undecyl) imidazolide, bis(tris(pentafluorophenyl)alumane)-4,5-bis (heptadecyl)imidazolide, bis(tris(pentafluorophenyl) alumane)imidazolinide, bis(tris(pentafluorophenyl) alumane)-2-undecylimidazolinide, bis(tris (pentafluorophenyl)alumane)-2-heptadecylimidazolinide, bis(tris(pentafluorophenyl)alumane)-4,5-bis(undecyl)imidazolinide, bis(tris(pentafluorophenyl)alumane)-4,5-bis (heptadecyl)imidazolinide, bis(tris(pentafluorophenyl)alumane)-5,6-dimethylbenzimidazolide, and bis(tris (pentafluorophenyl)alumane)-5,6-bis(undecyl) benzimidazolide. The foregoing activating cocatalysts have been previously taught with respect to different metal complexes in the following reference: EP 1 560 752 A1.

Another suitable ammonium salt, especially for use in heterogeneous catalyst compositions, is formed upon reaction of an organometal compound, especially a tri(C1-6 alkyl)aluminum compound with an ammonium salt of a hydroxyaryltris(fluoroaryl)borate compound. The resulting compound is an organometaloxyaryltris(fluoroaryl)borate compound which is generally insoluble in aliphatic liquids. Examples of suitable compounds include the reaction product of a tri(C1-6 alkyl)aluminum compound with the ammonium salt of hydroxyaryltris(aryl)borate. Suitable hydroxyaryltris(aryl)borates include the ammonium salts, especially the foregoing long chain alkyl ammonium salts of: (4-dimethylaluminumoxyphenyl)tris(pentafluorophenyl) borate, (4-dimethylaluminumoxy-3,5-di(trimethylsilyl)phenyl) tris(pentafluorophenyl)borate, (4-dimethylaluminumoxy-3,5-di(t-butyl)phenyl) tris(pentafluorophenyl)borate, (4-dimethylaluminumoxybenzyl) tris(pentafluorophenyl) borate, (4-dimethylaluminumoxy-3-methylphenyl) tris(pentafluorophenyl)borate, (4-dimethylaluminumoxy-tetrafluorophenyl) tris(pentafluorophenyl)borate, (5-dimethylaluminumoxy-2-naphthyl) tris(pentafluorophenyl)borate, 4-(4-dimethylaluminumoxyphenyl) phenyltris (pentafluorophenyl)borate, 4-(2-(4-(dimethylaluminumoxyphenyl)propane-2-yl)phenyloxy) tris(pentafluorophenyl)borate, (4-diethylaluminumoxyphenyl) tris(pentafluorophenyl) borate, (4-diethylaluminumoxy-3,5-di(trimethylsilyl)phenyl) tris(pentafluorophenyl) borate, (4-diethylaluminumoxy-3,5-di(t-butyl)phenyl) tris (pentafluorophenyl)borate, (4-diethylaluminumoxybenzyl) tris(pentafluorophenyl)borate, (4-diethylaluminumoxy-3-methylphenyl) tris(pentafluorophenyl)borate, (4-diethylaluminumoxy-tetrafluorophenyl) tris(pentafluorophenyl)borate, (5-diethylaluminumoxy-2-naphthyl) tris (pentafluorophenyl) borate, 4-(4-diethylaluminumoxyphenyl)phenyl tris(pentafluorophenyl) borate, 4-(2-(4-(diethylaluminumoxyphenyl)propane-2-yl) phenyloxy) tris(pentafluorophenyl)borate, (4-diisopropylaluminumoxyphenyl) tris(pentafluorophenyl) borate, (4-diisopropylaluminumoxy-3,5-di(trimethylsilyl) phenyl)-tris(pentafluorophenyl)borate, (4-diisopropylaluminumoxy-3,5-di(t-butyl)phenyl) tris(pentafluorophenyl) borate, (4-diisopropylaluminumoxybenzyl) tris (pentafluorophenyl)borate, (4-diisopropylaluminumoxy-3-methylphenyl) tris(pentafluorophenyl)borate, (4-diisopropylaluminumoxy-tetrafluorophenyl) tris(pentafluorophenyl)borate, (5-diisopropylaluminumoxy-2-naphthyl) tris(pentafluorophenyl)borate, 4-(4-diisopropylaluminumoxyphenyl)phenyl tris(pentafluorophenyl)borate, and 4-(2-(4-(diisopropylaluminumoxyphenyl)propane-2-yl)phenyloxy) tris(pentafluorophenyl)borate.

Especially preferred ammonium compounds are methyldi (tetradecyl)ammonium (4-diethylaluminumoxyphenyl) tris (pentafluorophenyl)borate, methyldi(hexadecyl)ammonium (4-diethylaluminumoxyphenyl) tris(pentafluorophenyl)borate, methyldi(octadecyl)ammonium (4-diethylaluminumoxyphenyl) tris(pentafluorophenyl) borate, and mixtures thereof. The foregoing complexes are disclosed in U.S. Pat. Nos. 5,834,393 and 5,783,512.

Another suitable ion-forming, activating compound comprises a salt of a cationic oxidizing agent and a noncoordinating, compatible anion represented by the formula:

(Oxe+)$d$(Ad-)$e$, wherein

Oxe+ is a cationic oxidizing agent having a charge of e+;

d is an integer from 1 to 3;

e is an integer from 1 to 3; and

Ad- is as previously defined.

Examples of cationic oxidizing agents include: ferrocenium, hydrocarbyl-substituted ferrocenium, $Pb^{+2}$ or $Ag+$. Preferred embodiments of Ad- are those anions previously defined with respect to the Bronsted acid containing activating cocatalysts, especially tetrakis(pentafluorophenyl) borate.

Another suitable ion-forming, activating compound comprises a compound which is a salt of a carbenium ion and a noncoordinating, compatible anion represented by the formula

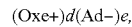

wherein:

@+ is a C1-20 carbenium ion; and

A− is a noncoordinating, compatible anion having a charge of −1. A preferred carbenium ion is the trityl cation, especially triphenylmethylium.

Preferred carbenium salt activating cocatalysts are triphenylmethylium tetrakis(pentafluorophenyl)borate, triphenylmethylium tetrakis(nonafluorobiphenyl)borate, tritolylmethylium tetrakis(pentafluorophenyl)borate and ether substituted adducts thereof.

The activating compounds may also be used in combination. An especially preferred combination is a mixture of a tri(hydrocarbyl)aluminum or tri(hydrocarbyl)borane compound having from 1 to 4 carbons in each hydrocarbyl group with an oligomeric or polymeric alumoxane compound.

The molar ratio of the rare earth element compound/the at least one activator compound typically ranges of from 1:10,000 to 10:1, preferably of from 1:5000 to 10:1, more preferably of from 1:2500 to 1:1.

Alumoxane, when used by itself as an activating compound, is preferably employed in large molar ratio, generally at least 50 times the quantity of the rare earth element compound on a molar basis. Tris(pentafluorophenyl)borane, where used as an activating compound, is preferably employed in a molar ratio to the rare earth element compound of from 0.5:1 to 10:1, more preferably from 1:1 to 6:1, most preferably from 1:1 to 5:1.

If the above-mentioned ion-forming compound comprising a compatible non-coordinating or poorly coordinating anion is used as an activating compound, it is preferable for the rare earth element compound according to the invention to be alkylated. Activators comprising boron are preferred.

Further activating compounds for use herein are combinations of neutral optional Lewis acids, especially the combination of a trialkyl aluminum compound having from 1 to 4 carbons in each alkyl group with one or more C1-30 hydrocarbyl-substituted Group 13 Lewis acid compounds, especially halogenated tetrakis(hydrocarbyl)boron or -aluminum compounds having from 1 to 20 carbons in each hydrocarbyl group, especially tetrakis(pentafluorophenyl)borate, tetrakis(3,5-bis(trifluoromethyl)phenyl)borate, further combinations of a single neutral Lewis acid, especially tetrakis(pentafluorophenyl)borate or tetrakis(3,5-bis(trifluoromethyl)phenyl)borate, with a polymeric or oligomeric alumoxane. A benefit according to the present invention is the discovery that the most efficient catalyst activation using such a combination of tetrakis(pentafluorophenyl)borate/alumoxane mixture occurs at reduced levels of alumoxane.

Preferred molar ratios of the rare earth compound:tetrakis(pentafluorophenyl)borate: alumoxane from 1:1:1 to 1:5:1.000, more preferably from 1:1:1.5 to 1:5:500. The surprising efficient use of lower levels of alumoxane with the present invention allows for the production of diene polymers with high catalytic efficiencies using less of the expensive alumoxane activator. Additionally, polymers with lower levels of aluminum residue, and hence greater clarity, are obtained. Preferred molar ratios of the metal complex:tetrakis(pentafluorophenyl)borate:neutral optional Lewis acids especially trialkyl aluminum or dialkyl aluminum hydride compounds are from 1:1:10 to 1:10:1000, more preferably from 1:1:20 to 1:5:500. Also in this case polymers are obtained with lower levels of aluminum residue, and hence greater clarity, are obtained.

The catalyst composition used in the process according to the invention either comprises at least one of the above rare earth element compounds as well as at least one of the activator compounds identified above, or the catalyst composition may comprise a reaction product of the activator compound and the rare earth element compound.

The catalyst composition may be formed, e.g. in situ in the polymerization reactor by adding the individual components of the catalyst composition (i.e. the rare earth element compound and the at least one activator compound) to a solution of the monomers. The term "in situ" in the context of the present invention means that the catalyst composition is not isolated prior to its use. For such a formation, at least one component of the catalyst composition is added individually. If the catalyst composition comprises a dialkyl aluminum hydride according to general formula (A6) and an alkyl aluminum chloride as a Lewis acid, then it may be preferable to, e.g. add the rare earth element compound and the dialkyl aluminum hydride to the polymerization reactor comprising the Lewis acid and a solution of monomers. In any case, it is to be understood that at least three molar equivalents of a conjugated diene monomer should be present before adding the activator compound to the rare earth element compound so as to avoid catalyst deactivation.

The catalyst composition may be formed, e.g. in situ in the polymerization reactor, for example by contacting the rare earth element compound and the activator compound on a support as a carrier. The support (hereinafter also referred to as "carrier") can be chosen from: clay, silica, charcoal (activated carbon), graphite, expanded clay, expanded graphite, carbon black, layered silicates, and alumina. Clays and layered silicates include, but are not limited to, magadiite, montmorillonite, hectorite, sepiolite, attapulgite, smectite, and laponite. Supported catalyst compositions of the invention may be prepared by several methods. For example, the rare earth element compound and optionally the activator compound can be combined before the addition of the support material. As discussed herein below, the mixture may be prepared in a conventional solution using a solvent. The solvent is preferably also suitable for use as a polymerization diluent for the liquid phase polymerization of an olefin monomer. Alternatively, the activator compound can be placed on the support material followed by the addition of the rare earth element compound or conversely, the rare earth element compound may be applied to the support material followed by the addition of the activator compound. The catalyst can be supported onto the carrier material using techniques such as solid-phase immobilization (SPI) described by H. C. L. Abbenhuis in Angew. Chem. Int. Ed. 37 (1998) 356-58 and by M. Buisio et al., in Microporous Mater., 5 (1995) 211 and by J. S. Beck et al., in J. Am. Chem. Soc., 114 (1992) 10834, as well as pore volume impregnation (PVI) (see WO 97/24344). The isolation of the impregnated carrier can be done by filtration or by removing the volatile material present (i.e., solvent) under reduced pressure or by heating.

The support, if present, is preferably employed in an amount to provide a weight ratio of catalyst composition (based on metal):support from 1:100,000 to 1:10, more preferably from 1:50,000 to 1:20, and most preferably from 1:10,000 to 1:30.

Instead of forming the catalyst composition in situ, the catalyst composition can also be preformed, for example by subjecting the rare earth element compound and the activator compound to an aging reaction in an aging reactor wherein a limited amount of diene is added to a mixture of the rare earth element compound and activator compound.

The catalyst composition may be formed in a suitable non-interfering solvent or reaction medium at a temperature of from −78° C. to 250° C., preferably of from −5° C. to 160° C., more preferably of from 10° C. to 110° C. Suitable reaction media for the formation of the catalyst composition are aliphatic and aromatic hydrocarbons and halohydrocarbons. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; chlorinated-, fluorinated- or chlorofluorinated hydrocarbons such as chloroform, dichloromethane, chlorobenzene, dichlorobenzene, and perfluorinated C4-10 alkanes; aromatic and hydrocarbyl-substituted aromatic compounds such as benzene, toluene, xylene, and styrene. If the catalyst composition is not formed in situ, the reaction medium used for forming the catalyst composition is in one preferred option the same reaction medium as the one used in polymerization step i), obviating the need to use a secondary solvent system.

If the catalyst composition is not formed in situ, the reaction medium used for forming the catalyst composition may then in another preferred option correspond to one of the solvents used the reaction medium in polymerization step i), obviating the need to use a secondary solvent system.

Separately prepared or preformed catalyst compositions can be stored at room temperature or even at elevated temperatures such as, for example, but not limited to, 50° C., in the solid state for extended periods of time. In addition, solutions of the catalyst compositions may be stored at room temperature before use. This greatly increases the flexibility of production in an industrial plant. A separately prepared (or preformed) catalyst composition usually does not require a separate aging step and if it is desirable to employ an optional aging step, it advantageously does not require long aging times. In case of a preformed catalyst, it is possible to start the polymerization reaction by adding the catalyst composition and the one or more diene monomer in any order into the polymerization reactor. The polymerization can be started for example either by addition of the catalyst composition to the monomer or by the addition of the one or more diene monomers as the last component. Alternatively, the catalyst composition—i.e. its individual components (including the rare earth element compound and the activator compound) or a reaction product hereof—or a solution thereof, may be fed to the polymerization reactor simultaneously during addition of the one or more diene monomers.

In the polymerization process, the catalyst composition is used in a catalytically effective amount, i.e., any amount that successfully results in the formation of a polymer. Such amounts may be readily determined by routine experimentation by the worker skilled in the art, but typically the molar ratio of catalyst composition:diene monomers is from $10^{-12}$:1 to $10^{-1}$:1, more preferably from $10^{-12}$:1 to $10^{-3}$:1.

The catalyst composition may also be utilized in combination with at least one additional homogeneous or heterogeneous polymerization catalyst in the same or in separate reactors connected in series or in parallel to prepare polymer blends having desirable properties, such as for example a different molecular weight distribution, including a bimodal molecular weight distribution. An example of such a process is disclosed in WO 94/00500, equivalent to U.S. Ser. No. 07/904,770, as well as U.S. Pat. No. 5,844,045. In case of solution or suspension/slurry type polymerizations as described herein below, the quantity of rare earth metal comprised in the catalyst composition to be used generally is such that its concentration in the solvent or dispersion agent amounts to $10^{-8}$-$10^{-3}$ mol/L, preferably $10^{-7}$-$10^{-4}$ mol/L.

Step i) of polymerizing the at least one diene monomer is preferably conducted at a temperature of between −50 and +250° C., preferably between −5 and +160° C., more preferably between 10° C. and 110° C.

In general, homo- and co-polymerization of the conjugated diene monomers may be accomplished at conditions well known in the art for Ziegler-Natta or Kaminsky-Sinn type polymerization reactions, such as at temperatures of from −50 to 250° C. The polymerization is generally conducted under batch, continuous or semicontinuous polymerization conditions. The polymerization process can be conducted as a gas phase polymerization (e.g. in a fluidized bed or stirred bed reactor), as a solution polymerization, wherein the homopolymer or copolymer formed is substantially soluble in the reaction mixture, a suspension/slurry polymerization, wherein the polymer formed is substantially insoluble in the reaction medium, as a solid phase powder polymerization or as a so-called bulk polymerization process, in which case an excess of monomer to be polymerized is used as the reaction medium. Preferably, the process according to the present invention is conducted under solution or bulk polymerization conditions. The polymerization may be conducted in one or more continuous stirred reactors or fluidized bed, gas phase reactors, connected in series or parallel. Monomer and/or solvent may be added to the reactor as is well known in the art. A continuous process is preferred, in which event advantageously, e.g. a mixture of the reaction components including catalyst composition, solvent and dienes is substantially supplied continuously or at frequent intervals into the reactor system, and polymerization is continuously monitored so as to ensure an efficient reaction and the production of the desired product which is continuously removed. For example, it is well known that many supported coordination catalysts and catalyst compositions for polymerization processes are highly sensitive, in varying degrees, to catalyst poisons such as water, oxygen, carbon oxides, acetylenic compounds and sulfur compounds. Introduction of such compounds may result in reactor upset and production of off-grade product. Typically, computer control and monitoring systems may be used to maintain process variables within acceptable limits, often by measuring polymer variables such as temperature, viscosity, molecular weight, flow rates or catalyst productivity. If the polymerization process is carried out under suspension or gas phase polymerization conditions, the temperatures typically are below 150° C.

The polymerization can be effected at atmospheric pressure, at sub-atmospheric pressure, or at elevated pressure of up to, or even higher than 500 MPa, continuously or discontinuously. Preferably, the homo- or copolymerization is performed at a pressure of from 0.01 to 500 MPa, more preferably at a pressure of from 0.01 to 10 MPa, most preferably at a pressure of from 0.1 to 2 MPa. Slurry and solution polymerizations normally take place at relatively low pressures, preferably at a pressure of less than 10 MPa. The polymerization can be carried out in the gas phase as well as in a liquid reaction medium.

The catalyst composition may be used to homopolymerize or copolymerize one or more diene monomers, preferably conjugated diene monomers having from 4 to 50 preferably from 4 to 12 carbon atoms either alone to give homopolymers or in combination with at least one different type of diene monomer or with a type of alpha-olefines for copolymers. Preferred monomers include conjugated dienes chosen from the group comprising internal conjugated olefins, cyclic conjugated olefins and non-cyclic conjugated olefins. Preferred conjugated dienes are 1,3-butadiene, isoprene (2-methyl-1,3-butadiene), 2,3-dimethyl-1,3-butadiene, 1,3-pentadiene, 2,4-hexadiene, 1,3-hexadiene, 2,4-hexadiene, 1,3-heptadiene, 1,3-octadiene, 2-methyl-2,4-pentadiene, cyclopentadiene, 2,4-hexadiene, 1,3-cyclooctadiene. Preferred alpha-olefine monomers for use as a comonomer in the polymerization of diene monomers are selected from ethene, propene, 1-butene, 1-pentene, 1-hexene, 4-methyl-1-pentene, 1-octene, styrene, alpha methylstyrene, divinyl benzene, acrylonitrile, acrylic acid ester, methylmethacrylate, ethylmethacrylate and n-butylmethacrylate. Ethylene, propene and styrene are preferred alpha-olefins.

Especially desirable polymers that are obtainable according to the present invention are homo-, co- and terpolymers of conjugated dienes, especially butadiene or isoprene, and random or block copolymers of at least one conjugated diene, especially butadiene, with at least one different type of conjugated diene, especially isoprene. Especially preferred are the homopolymerization of butadiene or isoprene as well as random or block copolymerizations, optionally terpolymerizations, of at least one conjugated diene, especially butadiene with at least one different type of conjugated diene, especially isoprene. Particularly preferred homopolymers are polybutadiene, and particularly preferred copolymers are copolymers of butadiene, isoprene and/or styrene. Butadiene and isoprene can be used as monomers regardless of their origin, including biochemical monomer synthesis processes, for example starting from biomass readily available, for example sugar.

In a preferred embodiment, dienes which can be used in the process according to the invention thus comprise at least one of butadiene, isoprene, pentadiene and 2,3-dimethylbutadiene, or a mixture of two or more of the monomers. In a preferred embodiment, the one or more diene monomers that are polymerized in step i) thus comprise at least one of these components. Depending on the polymer to be produced, step i) of polymerizing one or more diene monomers comprises a mixture of these dienes, e.g. a mixture of butadiene and isoprene. In a further embodiment, other monomers can be incorporated in polymerization step i) in addition to the one or more diene monomers indicated above. For example, such monomers preferably include styrene.

In a further embodiment, step i) of polymerizing one or more dienes is conducted in the presence of an organic solvent. Examples of suitable solvents include aromatic, aliphatic and/or cycloaliphatic hydrocarbons such as benzene, pentane, n-hexane, isohexane, heptane and/or cyclohexane. Preferably, polymerization is carried out in the presence of one of these solvents or a mixture thereof. Preferably, the inert organic solvent is used in amounts from 200 to 900 parts by weight, based on 100 parts by weight of monomer.

In one embodiment, polymerization step i) is carried out up to a conversion of as much as 99.9% of the diene monomers. Typically, the reaction mixture reaches 70% conversion or more, preferably 90% conversion or more, more preferably 95% or more, even more preferably 98% or more, most preferably 98% to 99.5% before the at least one alkoxysilane compound is added in step ii). Conversion can be detected by means of standard gravimetric methods using a Halogen Moisture Analyzer HR73 from Mettler Toledo.

In step ii) of the present process, at least one alkoxysilane compound is added to the reaction mixture obtained in step i). The at least one alkoxysilane compound is selected from the compounds represented by the above formulae (A1) through (A5). Preferred alkoxysilane compounds are selected from the above formulae (A1) to (A5), wherein groups R1, R2, R3, R4, R5, R6, R8, R9, R10, R12, R13 and R14 in formulae (A1) to (A5) independently from each other are $C_{1-8}$ alkyl groups. In a more preferred embodiment, R1, R3, R5, R9, R13 and R14 in formulae (A1) to (A5) independently from each other are $C_{1-4}$ alkyl groups, preferably methyl or ethyl. Preferably, the one or more alkoxysilane compounds are selected from the above formulae (A1), (A2), (A3) and (A4), more preferably from (A1) and (A3). In a preferred embodiment of Formula (A1): if s is 1, q is an integer selected from 4; r is an integer selected from 0; and q+r=4; and if s in formula (A1) is 2, then q preferably is an integer selected from 3; r is an integer selected from 0; and q+r=3. In a preferred embodiment of Formula (A2): t is an integer selected from 3; u is an integer selected from 0; and t+u=3. In a preferred embodiment of Formula (A3): w is an integer selected from 3; x is an integer selected from 0; and w+x=3; and in a preferred embodiment of Formula (A4): y is an integer selected from 3; z is an integer selected from 0; and y+z=3.

The term "alkyl" as used throughout the invention refers to a hydrocarbon group that may be straight chain, branched or cyclic, having the number of carbon atoms designated (i.e. $C_{1-8}$ alkyl means 1-8 carbon atoms).

Examples of alkyl groups include methyl, ethyl, n-propyl, isopropyl and butyl, t-butyl, isobutyl, sec-butyl, cyclohexyl, cyclopentyl, (cyclohexyl)methyl, (cyclopropyl)methyl, octane, etc. Alkyl groups can be substituted or unsubstituted. Examples of substituted alkyl groups include haloalkyl, thioalkyl, aminoalkyl, and the like.

In a preferred embodiment, the alkoxysilane is selected from $(CH_3O)_4Si$, $((CH_3O)_3Si)_2$ and $(CH_3O)_3Si—(CH_2)_3—S—Si(CH_3)_2C(CH_3)_3$ and mixtures thereof.

Preferably, the amount of alkoxysilanes as added in step ii) of the present process is based on a molar ratio ([mol]/[mol]) of Si as contained in the alkoxysilane compound/polymer of from 0.2 to 2, preferably of from 0.5 to 1.

Addition of the at least one alkoxysilane compound is preferably done at a temperature of from 30 to 100° C., and the at least one alkoxysilane compound is preferably added at a pressure of from 0.2 to 5 bar.

As regards step iii) of adding $S_2Cl_2$, $SCl_2$, $SOCl_2$, $S_2Br_2$, $SOBr_2$ or a mixture thereof to the reaction mixture obtained in step ii), typically less than 0.05 parts by weight, preferably 0.01 to 0.045, more preferably 0.01 to 0.035, and even more preferably 0.01 to 0.02 parts by weight of $S_2Cl_2$, $SCl_2$, $SOCl_2$, $S_2Br_2$, $SOBr_2$ or a mixture thereof are added to 100 parts by weight of diene polymer. In a preferred embodiment, $S_2Cl_2$ and/or $S_2Br_2$ are added in step iii).

It has been found that keeping the amounts of $S_2Cl_2$, $SCl_2$, $SOCl_2$, $S_2Br_2$, $SOBr_2$ or the mixture thereof in the indicated ranges facilitates valuable solution viscosities of the resulting polymer. "Valuable" solution viscosities in this context means that the solution viscosity can be reduced as compared to prior art polymers having a similar number average molecular weight (Mn). At the same time these ranges allow the composition comprising the polymers and a filler to gain a favourable Mooney viscosity value as compared to compositions which are based on conventional polymers and the filler. Therefore, the invention enables relatively low Mooney viscosity values in the context of compositions comprising a polymer according to the present invention and a filler such as carbon black or silica if compared with the corresponding Mooney viscosity of a composition comprising a prior art polymer and the filler wherein both polymers (i.e. the polymer according to the invention as well as the prior art polymer) have similar Mooney viscosity values before mixing them with the filler.

$S_2Cl_2$, $SCl_2$, $SOCl_2$, $S_2Br_2$, $SOBr_2$ or the mixture thereof are usually added at a temperature of from 20 to 150° C., preferably at a temperature of from 30 to 120° C., more preferably at a temperature of from 40 to 90° C.

In step iii), $S_2Cl_2$, $SCl_2$, $SOCl_2$, $S_2Br_2$, $SOBr_2$ or the mixture thereof is stirred with the reaction mixture for more than 1 minutes, preferably for about 2 to 60 minutes, more preferably for about 3 to 30 minutes before work up. Work up may include step iv), i.e. the optional addition of a protic agent to deactivate the catalyst composition.

The protic agent used in optional step iv) for catalyst deactivation can be any suitable protic agent such as water, an organic acid or an alcohol. Suitable organic acids include stearic acid. Suitable alcohols include methanol, ethanol and iso-propanol. The amount used for catalyst deactivation preferably is in the range of from 1 to 30 Mol of protic agent per Mol of the rare earth element, more preferably of from 2 to 20, most preferably of from 3 to 10 Mol of protic agent per Mol of the rare earth element. Without wishing to be bound by theory, it is believed that addition of water, an organic acid and/or an alcohol not only deactivates the catalyst but also renders metal organic residues derived from the rare earth catalyst less reactive and thus less dangerous. Removal of the catalyst composition, the thio compound and the alkoxysilane can sometimes be omitted, particularly when the quantity of components of the catalyst composition, of the thio compound and/or the alkoxysilane compound in the polymer or copolymer, in particular the content of halogen and metal, is very low. If desired, however, the level of residues derived from the catalyst composition, from the thio compound or from the alkoxysilane compound in the polymer, can be reduced in a known manner, for example, by washing. The deactivation step can be followed by a stripping step (removal of organic solvent(s) from the polymer). Alternatively the solvent can be removed at reduced pressure.

The process according to the invention may involve other components. In particular, oils, fillers and/or vulcanizing agents may be added in additional steps. In a further embodiment, the process according to the present invention thus comprises the additional step v): adding oil and/or a filler to the reaction mixture obtained in any of steps iii) or iv) or adding oil and/or a filler to the polymer obtained after solvent removal. The filler is preferably added to the polymer after completion of solvent removal.

For representative examples of oils, reference is made to International Patent Application No. PCT/US09/045553 and U.S. Patent Application Publication No. 2005/0159513, each of which is incorporated herein by reference in its entirety. Representative oils include but are not limited to MES (Mild Extraction Solvate), TDAE (Treated Distillate Aromatic Extract), RAE (Residual Aromatic Extract) including but not limited to T-RAE and S-RAE, DAE including T-DAE and NAP (light and heavy naphthenic oils), including but not limited to Nytex 4700, Nytex 8450, Nytex 5450, Nytex 832, Tufflo 2000, and Tufflo 1200. In addition, native oils, including but not limited to vegetable oils, can be used as extender oils. Representative oils also include functionalized variations of the aforementioned oils, particularly epoxidized or hydroxylated oils. Aforementioned oils comprise different concentrations of polycyclic aromatic compounds, parafinics, naphthenics and aromatics, and have different glass transition temperatures. The above mentioned types of oil have been characterized in "Kautschuk Gummi Kunststoffe", vol. 52, pages 799-805. In some embodiments, the MES, RAE and TDAE are preferred extender oils for rubber.

Examples of suitable fillers include carbon black, silica, carbon-silica dual-phase filler, clay (layered silicates), calcium carbonate, magnesium carbonate, lignin, carbon nano tubes, amorphous fillers, such as glass particle based fillers, starch based fillers, and the like, and combinations thereof. Further examples of fillers are described in International Application No. PCT/US2009/045553 fully incorporated herein by reference. In some embodiments, the combined use of carbon black and silica, the use of carbon-silica dual-phase-fillers alone, or the combined use of carbon-silica dual-phase-filler and carbon black and/or silica are employed. In a preferred embodiment, the filler is selected from silica and carbon black or a mixture hereof.

Preferred examples of carbon black include carbon black which is manufactured by a furnace method and which has a surface area determined by nitrogen adsorption (hereinafter also referred to as "N2A" or "BET" method) of from 50 to 200 m2/g, preferably of from 60 to 150 m2/g, and DBP oil absorption of 80-200 ml/100 grams. For example, FEF; HAF, ISAF, or SAF class carbon black may be used. In some embodiments, high agglomeration type carbon black is used. Carbon black is typically added in an amount of from 2 to 100 parts by weight, preferably of from 5 to 100 parts by weight, and more preferably of from 10 to 100 parts by weight, most preferably of from 10 to 95 parts by weight for 100 parts by weight of the polymer.

Examples of silica fillers include but are not limited to wet process silica, dry process silica, synthetic silicate-type silica, and combinations thereof. Silica with a small particle diameter and a high surface area exhibits a high reinforcing effect. Small diameter, high agglomeration-type silica (i.e., having a large surface area and high oil absorptivity) exhibits excellent dispersability in the elastomeric polymer composition, representing desirable properties and superior processability. In a preferred embodiment, the average particle diameter of silica, in terms of a primary particle diameter, is thus of from 5 to 60 nm, preferably of from 10 to 35 nm. In a further preferred embodiment of the invention, silica having a surface area determined by nitrogen adsorption (hereinafter referred to as "N2A" or "BET" method) of from 35 to 300 m2/g, preferably of from 150 to 300 m2/g is used as filler. Silica is typically added in an amount of from 2 to 100 parts by weight, preferably of from 5 to 100 parts by weight, and more preferably of from 10 to 100 parts by weight, most preferably of from 10 to 95 parts by weight for 100 parts by weight of polymer.

If carbon black and silica are added together, the total amount of carbon black and silica preferably is of from 30 to 100 parts by weight, more preferably of from 30 to 95 parts by weight per 100 parts by weight of polymer contained in the composition comprising the polymer made by the inventive process and the filler. So long as such fillers are homogeneously dispersed in the composition, increasing quantities (within the above cited ranges) result in compositions having excellent rolling and extruding processability, and vulcanized products exhibiting favorable hysteresis loss properties, rolling resistance, improved wet skid resistance, abrasion resistance, and tensile strength.

Carbon-silica dual-phase-filler may be used either independently or in combination with carbon black and/or silica in accordance with the present teachings. Carbon-silica dual-phase-filler can exhibit the same effects as those obtained by the combined use of carbon black and silica, even in the case where it is added alone. Carbon-silica dual-phase-filler is so called silica-coated-carbon black made by coating silica over the surface of carbon black, and is commercially available under the trademark CRX2000, CRX2002, or CRX2006 (products of Cabot Co.). Carbon-silica dual-phase-filler is added in the same amounts as previously described with respect to silica. Carbon-silica dual-phase-filler can be used in combinations with other fillers including but not limited to carbon black, silica, clay, calcium carbonate, carbon nano tubes, magnesium carbonate, and combinations thereof. In some embodiments, carbon black and silica, either individually or in combination, are used.

Silica, carbon black or carbon black-silica dual-phase-fillers or combinations thereof can be used in combination with natural fillers including but not limited to starch or lignin.

In yet another embodiment, the process may comprise a further step vi) of adding a vulcanizing agent and vulcanizing the polymer obtained in any of steps iii) and iv) or adding a vulcanizing agent to the composition obtained from step v) and vulcanizing the polymer. Preferably the vulcanizing agent is added to the composition obtained in step v). It has been found that the polymers according to the present invention show similar vulcanization behavior, e.g. in terms of vulcanization kinetics, as common elastomeric polymers, in particular rubber, specifically high cis polybutadiene that are obtained according to standard procedures.

Sulfur, sulfur-containing compounds acting as sulfur-donors, sulfur-accelerator systems, and peroxides are the most common vulcanizing agents. Examples of sulfur-containing compounds acting as sulfur-donors include but are not limited to dithiodimorpholine (DTDM), tetramethylthiuramdisulphide (TMTD), tetraethylthiuramdisulphide (TETD), and dipentamethylenthiuramtetrasulphide (DPTT). Examples of sulfur accelerators include but are not limited to amine derivates, guanidine derivates, aldehydeamine condensation products, thiazoles, thiuram sulphides, dithiocarbamates and thiophospahtes. Examples of peroxides used as vulcanizing agents include but are not limited to di-tert.-butyl-peroxides, di-(tert.-butyl-peroxy-trimethyl-cyclohexane), di-(tert.-butyl-peroxy-isopropyl-)benzene, dichloro-benzoylperoxide, dicumylperoxides, tert.-butyl-cumyl-peroxide, dimethyl-di(tert.-butyl-peroxy)hexane and dimethyl-di(tert.-butyl-peroxy)hexine and butyl-di(tert.-butyl-peroxy)valerate (Rubber Handbook, SGF, The Swedish Institution of Rubber Technolgy 2000). Further examples and additional information regarding vulcanizing agents can be found in Kirk-Othmer, Encyclopedia of Chemical technology 3rd, Ed., (Wiley Interscience, N.Y. 1982) volume 20, pp. 365-468, (specifically "Vulcanizing Agents and Auxiliary Materials" pp. 390-402). A vulcanizing accelerator of sulfene amide-type, guanidine-type, or thiuram-type can be used together with a vulcanizing agent as required. Other additives such as zinc white, vulcanization auxiliaries, aging preventives, processing adjuvants, and the like may be optionally added.

If added, the vulcanizing agent is typically added to the polymer or to the composition comprising the polymer in an amount of from 0.5 to 10 parts by weight, preferably of from 1 to 6 parts by weight per 100 parts by weight of polymer.

The aforementioned ranges are to be construed as disclosing each and every value falling within the given ranges. They are merely abbreviated representations that should not be construed as not-individually disclosing each value within the range. Moreover, the aforementioned ranges must be construed as disclosing not only the individual values in each range but also any combination between the individual values from these ranges.

The process of the invention yields polymers with improved processing properties. Without wishing to be bound by theory, it is believed that the improved processing behavior is the result of a specific branching between the polymer chains resulting in "modified" polymers. It is assumed that the unique polymer structure is the inherent result of first adding one or more alkoxysilane compounds to the reaction mixture provided in step i) before a thio compound is added to said mixture.

The polymers obtainable according to the process of the present invention typically have a number average molecular weight (Mn) of from between 75,000 and 2,500,000 g/mol preferably between 100,000 and 1,500,000 g/mol and more preferably from 125,000 and 1,000,000 g/mol and a weight average molecular weight (Mw) of from between 150,000 and 2,500,000 g/mol preferably between 200,000 and 1,500,000 g/mol and more preferably from 250,000 and 1,100,000 g/mol. The preferred molecular weight distribution of the polymer, represented by the ratio of the weight average molecular weight to the number average molecular weight, (Mw/Mn), ranges from 1.0 to 10.0, preferably from 1.2 to 5.0 and more preferably from 1.5 to 2.5.

The polymers of the present invention show reduced solution viscosities as compared to linear polymers having a similar polymer average number molecular weight (Mn). A reduced solution viscosity improves the polymer production process, particularly in that it enables higher production throughput. Particularly the polymerization may lead to a higher polymer concentration in the polymerization solvent increasing the production rate accordingly.

While dependent upon the specific polymer and desired end use application, the polymers of the present invention including oil-comprising polymers, preferably have Mooney viscosity values (ML 1+4, 100° C.) as measured in accordance with ASTM D 1646 (2004) using a Monsanto MV2000 instrument, in the range of from 20 to 150, preferably of from 25 to 120, and more preferably in the range of from 30 to 90, and most preferably of from 35 to 80. It has been found that polymers which are obtainable according to the present invention are particularly favorable in terms of processability of compositions comprising the polymer and a filler which leads to an easier filler incorporation in the internal mixer, improved banding on the roll mill, accelerated extrusion rate, improved extrudate die swell, smoothness, etc.). Furthermore the polymers are beneficial in handling, green strength, and dimensional stability during storage if they have a Mooney viscosity falling within the above range. Particularly, compositions comprising a filler and the polymer according to the present invention have a lower polymer composition Mooney viscosity as compared to compositions that are not based on a polymer made by the inventive process, provided the Mooney viscosities of the filler free polymers are similar.

In one embodiment, the polymers obtainable according to the process of the present invention have Mooney viscosities of from 35 to 60. In a further embodiment, the polymers have Mooney viscosity values of from 60 to 80. Polymers having Mooney viscosities of from 35 to 60 typically have a polymer solution viscosity of less than 30000 cPoise, preferably less than 15000, and most preferably below 10000 cPoise at shear rates between 10 and 20 (1/s) if diluted in n-Hexane at 70° C. and 19 wt.-% polymer concentration. Polymers having Mooney viscosities of from 60 to 80 typically have a polymer solution viscosity of less than 40000 cPoise, preferably of less than 25000, and most preferably below 15000 cPoise at shear rates between 10 and 20 (1/s) if diluted in n-Hexane at 70° C. and 19 wt.-% polymer concentration.

The polymers according to the present invention can favourably be used for making rubber products as well as objects and devices, such as products like tires, tire treads and tire side walls. Likewise, the polymers of the present invention may be mixed with other polymers to give polymer blends. It is further possible to use the polymer according to the present invention for modifying plastics such as polystyrene, acrylonitrile-butadiene-styrene (ABS) copolymers, polyurethane or polycarbonate.

Products, preferably cured products, comprising the polymer according to the invention, e.g. tires, show favourable performance properties in terms of, e.g. rolling resistance, wet grip, ice grip, abrasion, dynamic modulus and heat built up.

The invention will now be described in further detail by way of the following example:

EXAMPLES

Test Methods
cis-1,4- and 1,2-polybutadiene content

The concentration of cis-1,4- and 1,2-polybutadiene was determined by IR and 13C NMR-spectroscopy. The 1D NMR spectra were collected on a BRUKER Avance 200 NMR spectrometer (BRUKER BioSpin GmbH), using a "5 mm Dual detection probe." The field homogeneity was optimized by maximizing the deuterium lock signal. The samples were shimmed by optimizing the deuterium lock signal. The samples were run at room temperature (298 K). The following deuterated solvents were used: C6D6 (7.15 ppm for 1H; 128.02 ppm for 13C), the signals of the remaining protons of deuterated solvents were each used as an internal reference.

For spectral processing, the BRUKER 1D WINNMR software (version 6.0) was used. Phasing, base line correction and spectral integration of the resulting spectra was done in the manual mode. For acquisition parameters see Table 1.

TABLE 1

1D-NMR acquisition parameters using BRUKER standard pulse sequences

| | 1H-NMR | 13C-NMR |
|---|---|---|
| Observe frequency | 200.130 MHz | 50,323 MHz |
| Spectral width | 4139.073 Hz | 12562.814 |
| BRUKER Pulse program | Zg30 | Zgpg30 |
| Pulse angle | 30° | 30° |
| Relaxation delay | 1.0 s | 2.0 s |
| Number of Data points for FT | 32K | 32K |
| Line broadening | 0.5 Hz | 1 Hz |
| Number of accumulated scans | 64 | >1000 |

Size Exclusion Chromatography

Molecular weight and molecular weight distribution of the polymer were each measured using Size Exclusion Chromatography (SEC) based on polystyrene standards.
Sample Preparation:

a1) Oil free polymer samples:
About "9-11 mg" dried polymer sample (moisture content <0.6%) was dissolved in 10 mL tetrahydrofurane, using a brown vial of 10 mL size. The polymer was dissolved by shaking the vial for 20 min at 200 u/min.

a2) oil containing polymer samples:
About "12-14 mg" dried polymer sample (moisture content <0.6%) was dissolved in 10 mL tetrahydrofurane, using a brown vial of 10 mL size. The polymer was dissolved by shaking the vial for 20 min at 200 u/min.

b) Polymer solution was transferred into a 2 ml vial using a 0.45 μm disposable filter.

c) The 2 ml vial was placed on a sampler for GPC-analysis.

Elution rate: 1.00 mL/min
Injection volume: 100.00 μm (GPC-method B 50.00 μm)
The measurement was performed in THF at 40° C.). Instrument: Agilent Serie 1100/1200; Module setup: Iso pump, autosampler, thermostate, VW—Detector, RI—Detector, Degasser; Columns PL Mixed B/HP Mixed B.

In each GPC-device 3 columns were used in an connected mode. The length of each of the columns: 300 mm; Column Type: 79911 GP-MXB, Plgel 10 μm MIXED-B GPC/SEC Columns, Fa. Agilent Technologies (eigentlicher Hersteller ist auch Polymer Laboratories)
GPC Standards: EasiCal PS-1 Polystyrene Standards, Spatula A+B (Styrene Standard Manufacturer: Polymer Laboratories (Now entity of Varian, Inc.; Varian Deutschland GmbH; http://www.polymerlabs.com)
Mooney Viscosity ML1+4 (100° C.)

Mooney viscosity was measured according to ASTM D 1646 (2004), with a preheating time of one minute and a rotor operation time of 4 minutes, at a temperature of 100° C. [ML1+4(100° C.)], on a MV 2000E from Alpha Technologies UK. The rubber Mooney viscosity measurement is performed on dry (solvent free) raw polymer (unvulcanized rubber). The Compound Moony viscosity is measured on an uncured (unvulcanized) second state polymer compound sample prepared according to Tables 4, 5 and 6. The Compound Mooney values are listed in Tables 8 and 10.
Vulcanizate Compound Properties Tensile Strength, Elongation at Break and Modulus at 300% Elongation (Modulus 300) were measured according to ASTM D 412-98A (reapproved 2002), using a dumbbell die C test pieces on a Zwick Z010. Of the standardized dumbbell die C test pieces, those of "2 mm thickness" were used. The tensile strength measurement was performed at room temperature, on a cured (vulcanized) second stage polymer sample, prepared according to Tables 4, 5 and 6. Stage 2 formulations were vulcanized within 20 minutes at 160° C. to TC 95 (95% vulcanization conversion).

Heat build up was measured according to ASTM D 623, method A, on a Doli 'Goodrich'-Flexometer. The heat built up measurement was performed on vulcanized second stage polymer samples.

Tan δ at 60° C. and Tan δ at 0° C., as well as Tan δ at −10° C. measurements, were performed on cylindrical specimen, using a dynamic mechanical thermal spectrometer "Eplexor 150N," manufactured by Gabo Qualimeter Testanlagen GmbH (Germany), by applying a compression dynamic strain of 0.2%, at a frequency of 2 Hz, at the respective temperatures. The smaller the index at a temperature of 60° C., the lower is the rolling resistance. Tan δ (0° C.) was measured using the same equipment and load conditions at 0° C. The larger the index at this temperature, the better the wet skid resistance. Tan δ at 60° C. and Tan δ at 0° C., as well as Tan δ at −10° C. were determined (see Tables 9 and 11).

DIN abrasion was measured according to DIN 53516 (1987-06-01). The larger the index, the lower the wear resistance. The abrasion measurement was performed on a vulcanized, second stage polymer formulation. In general, the higher the values for Elongation at Break, Tensile Strength, Modulus 300, and Tan δ at 0° C., the better the sample performance; whereas the lower the Tan δ at 60° C., Heat Build Up, and Abrasion, the better the sample performance.

Examples 1 to 3—Batch Polymerisation/In Situ Formation of Catalyst 4000 g Cyclohexane and 1,3-butadiene (see table 1 for amount of 1,3-butadiene) were placed in a 20 l polymerization pressure reactor (available from Karl Kurt Juchheim Laborgerate GmbH, 1997 model, fabric. No. 2245) under nitrogen at 20° C. before adding di-iso-butyl aluminum hydride (DiBAH; 0.25 molar solution in Cyclohexane) and diethylaluminum chloride (DEAC; 0.1 molar solution in cyclohexane) in the amounts specified in table 1.

360 g cyclohexane was placed in a second pressure vessel under nitrogen (1 to 2 liter pressure reaction vessel available from Büchiglasuster, fabric. No. 3618, model 2002) and cooled to 10° C. before 8 g DiBAH (0.25 molar solution in cyclohexane), Neodymium(versatate)$_3$ (0.029 molar in cyclohexane; NdV40® purchased from Rhodia; see "rare earth element compound" in table 1 for amount) and 1,3-butadiene (molar ratio of butadiene to Nd=12) were added.

Polymerization was started by adding the content of the second vessel to the polymerization reactor. The temperature was adjusted to 65° C. and rose up to 80° C. within 30 min. Monomer conversion was monitored using a halogen moisture Analyzer HR 73 (Mettler Toledo) by weighing 3 to 4 g polymer solution into 50 ml Ethanol, filtering and transferring the precipitate to the sample holder of the moisture analyzer and drying at 140° C. for 5 to 10 minutes until weight remains constant. Conversion is calculated as: conversion %=[weight (dried polymer sample)*(total weight of reaction mixture)*100]/[weight (sample of polymer solution)*total weight of monomers]. Once 98% butadiene conversion was reached, a solution of alkoxysilane (1 weight percent in cyclohexane) was added (see table 1 for amount and silane). The reaction mixture was stirred for another 15 minutes before a solution of disulfur dichloride (0.1 weight percent in cyclohexane) was added in the amount specified in table 1.

The resulting polymer solution was stirred for 30 minutes before it was stripped with steam for one hour to remove solvent and other volatiles and dried in an oven at 70° C. for 30 minutes and another one to three days at room temperature.

Examples 4 to 6, 8 to 10—Continuous Polymerisation/Preformed Catalyst

Examples 4 to 6 and 8 to 10 were performed by means of three continuous stirred tank reactors (CSTRs) connected in series. Each reactor had a volume of 5 liter and was equipped with a helicoidal stirrer, suitable for mixing high viscous solutions, the speed of the stirrer during all trials was 200 rpm. External water circulation in the reactor walls regulated the temperature of all three reactors to 80° C.

The reagents required for polymerization, i.e. the preformed catalyst (COMCAT Nd8.8; available from COMAR Chemicals Ltd.; applied as solution of 0.022 mol Nd per kg cyclohexane solution) and 1,3-butadiene (see table 1 for amount) as well as cyclohexane were continuously fed into the head of the first reactor with mass flow-meters. Each flow-meter regulated the desired feed, and guaranteed a constant flow of the reagent. The flow of the preformed catalyst was 0.68 to 0.69 mmol/h based on Nd (see "rare earth element compound" in table 1 for exact amount, the values indicated in table 1 are calculated based on the product specification available from COMAR Chemicals Ltd. taking this flow into account. The flow of butadiene is indicated in table 1. The flow of cyclohexane was adjusted such that the total flow of reactants and solvent was 2.500 g/h.

The flow of the total amount of 1,3-butadiene, catalyst solution and solvent was adjusted in order to achieve a residence time of 115 minutes in each reactor. The conversion after the first reactor was >95% conversion (calculated as described above with respect to Example 1). In the second reactor, a solution of alkoxysilane (1 weight percent in cyclohexane) was added to the polymer solution (see table 1 for amount and silane) followed by the addition of a solution of disulfur dichloride (0.1 weight percent in cyclohexane) through the inlet of the third reactor see table 1 for amount).

The resulting polymer solution continuously collected and afterwards stripped with steam for one hour to remove solvent and other volatiles and dried in an oven at 70° C. for 30 minutes and another one to three days at room temperature.

Example 7—Batch Polymerisation/Preformed Catalyst 4000 g Cyclohexane and 1,3-butadiene (see table 1 for amount of 1,3-butadiene) were placed in a 20 l polymerization pressure reactor (available from Karl Kurt Juchheim Laborgerate GmbH, 1997 model, fabric. No. 2245) under nitrogen at 20° C. Polymerization was started by adding a solution of a preformed catalyst containing 0.89 mmol based on Nd (COMCAT Nd8.8; available from COMAR Chemicals Ltd.; applied as solution of 0.022 mol Nd per kg cyclohexane solution; amount as indicated in table 1-see "rare earth element compound"; the values for DEAC/EASC and DiBAH are estimated based on the product specification available from COMAR Chemicals Ltd.) to the polymerization reactor. The temperature was adjusted to 65° C. and rose up to 80° C. within 20 minutes. Monomer conversion was monitored as described above for Example 1. Once 98% Butadiene conversion was reached, 3.5 mmol "alkoxysilane compound SS" (see below for preparation of alkoxysilane compound SS) was added. The reaction mixture was stirred for another 15 minutes before adding 1 mmol disulfur dichloride.

The resulting polymer solution was stirred for 30 minutes before it was stripped with steam for one hour to remove solvent and other volatiles and dried in an oven at 70° C. for 30 minutes and another one to three days at room temperature.

Preparation of Alkoxysilane Compound SS

Alkoxysilane Compound SS is represented by Formula SS below, and can be prepared as follows by preparation pathway 1 or 2.

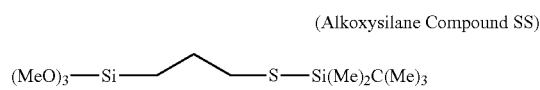
(Alkoxysilane Compound SS)

$(MeO)_3$—Si—⋀—S—$Si(Me)_2C(Me)_3$

Preparation Pathway 1 (SS):

To a 100 mL Schlenk flask was charged 25 ml tetrahydrofuran (THF), 79.5 mg (10 mmol) lithium hydride, and subsequently, 1.96 g (10 mmol) gamma-mercaptopropyl trimethoxy silane [Silquest A-189] from the Cromton GmbH. The reaction mixture was stirred for 24 hours at 20 to 25° C., and another two hours at 50° C. Then, tert-butyl dimethyl chloro silane (1.51 g (10 mmol)) was dissolved in 10 g THF, and the resulting solution was added drop wise to the Schlenk flask. Lithium chloride precipitated. The suspension was stirred for about 24 hours at room temperature, and for another two hours at 50° C. The THF solvent was removed under vacuum before cyclohexane (30 ml) was added to yield a white precipitate. The white precipitate was subsequently separated by filtration. The cyclohexane solvent was removed under vacuum (reduced pressure). The resulting colorless liquid proved to be alkoxysilane compound SS in 99% purity (GC), and therefore no further purification was necessary. A yield of 2.9 g (9.2 mmol) of modified coupling agent (SS) was obtained.

Preparation Pathway 2 (SS):

To a 100 mL Schlenk flask was charged 1.96 g (10 mmol) gamma-mercaptopropyl trimethoxy silane [Silquest A-189] from Cromton GmbH, 25 ml tetrahydrofuran (THF), and subsequently, 0.594 g (11 mmol) sodium methanolate (NaOMe) dissolved in 10 mL THF. The reaction mixture was stirred for 18 hours at 20 to 25° C. Then, tert-butyl dimethyl chloro silane (1.51 g (10 mmol)) was dissolved in 10 g THF, and the resulting solution was added drop wise to the Schlenk flask. Sodium chloride precipitated. The suspension was stirred for about 24 hours at room temperature, and for another two hours at 50° C. The THF solvent was removed under vacuum before cyclohexane (30 ml) was added to yield a white precipitate which was subsequently removed by filtration. The cyclohexane solvent was removed under vacuum (reduced pressure). The resulting colorless liquid solution proved to be alkoxysilane compound SS in 89% purity (GC). After further purification by means of fractionated distillation, a yield of 2.2 g (7.2 mmol) of alkoxysilane compound SS was obtained.

TABLE 1 polymerization

| Example | rare earth compound (mmol) | DEAC[1] (mmol) | DiBAH (mmol) | 1,3-butadiene (mol) | alkoxy silane compound (silane: mmol) | Thio compound (S2Cl2; mmol) |
|---|---|---|---|---|---|---|
| 1 | 1 | 2.5 | 12 | 12.37 | 0 | 0 |
| 2 | 1.05 | 2.57 | 13.3 | 12.73 | TMS: 4.46 | 2.5 |
| 3 | 1.13 | 2.51 | 12 | 12.7 | HMDS: 3.22 | 1.6 |
| 4 | 0.68/h | 1.7-2/h | 7-12/h | 6.1/h | TMS: 0.55/h | 0.5/h |
| 5 | 0.69/h | 1.7-2/h | 7-12/h | 6.2/h | TMS: 0.32/h; HMDS: 0.08/h | 0.6/h |
| 6 | 0.69/h | 1.7-2/h | 7-12/h | 6.3/h | HMDS: 0.3/h | 0.54/h |
| 7 | 0.89 | 2.2-2.6 | 9-15 | 6.3 | „SS": 3.5 | 1 |
| 8 | 0.68/h | 1.7-2/h | 7-12/h | 6.2/h | TMS: 0.6/h | 0.5/h |
| 9 | 0.68/h | 1.7-2/h | 7-12/h | 6.1/h | TMS: 0.55/h | 0.5/h |
| 10 | 0.69/h | 1.7-2/h | 7-12/h | 6.1/h | HMDS: 0.3/h | 0.4/h |

TMS = tetramethoxysilane
HMDS = hexamethoxydisilane
[1]instead of DEAC alone, a mixture of diethyl aluminum chloride (DEAC) and ethyl aluminum sesquichloride (EASC) was used in examples 4 to 10 for catalyst formation The polymers obtained according to examples 1 to 10 were analyzed. The cis-1,4 polybutadiene content was determined to be above 96% for each polymer, the trans-1,4 content was of from 1.5 to 2.5% for each polymer, and the vinyl content (1,2-polybutadiene unit content) was found to be 1 mol % for each polymer. Further polymer characteristics are given in Table 2.

TABLE 2

Polymer Characteristics

| Polymer Example | $Mn^A$ [g/mol] | $Mw^A$ [g/mol] | $Mw/Mn^A$ | Polymer Solution Viscosity [cPoise at shear-rate 16/s] | Mooney viscosity [MU] |
|---|---|---|---|---|---|
| 1 | 247223 | 853819 | 3.45 | 17500E | 43.6 |
| 2 | 185190 | 670038 | 3.63 | 20200D | 45.5 |
| 3 | 211410 | 711052 | 3.36 | n.d.$^G$ | 47.6 |
| 4 | n.d. | n.d. | n.d. | n.d. | 41.8 |
| 5 | 217812 | 463498 | 2.13 | n.d. | 43.6 |
| 6 | 195969 | 470850 | 2.40 | n.d. | 40.6 |
| 7 | 252037 | 571765 | 2.27 | n.d. | 46.6 |
| 8 | 181403 | 444036 | 2.45 | 12200E | 41.2 |
| 9 | 192888 | 453605 | 2.35 | n.d. | 41.8 |
| 10 | 194744 | 442152 | 2.27 | n.d. | 40.0 |
| CB25[F] | 273917 | 599730 | 2.19 | 24200D | 46.0 |

D: measured at 19 wt.-% polymer concentration in cyclohexane at 70° C. using a RS600 rheometer instrument from Thermo-Haake, Germany;
E: measured at 19 wt.-% polymer concentration in an equimolar mix of n-hexane and n-heptane at 45° C. using a RheolabQC instrument from Anton Paar.
[F]CB25 is a high cis butadiene rubber that is commercially available from Lanxess and is produced using a neodymium catalyst and reacting the polymer chains with S2C12.
$^G$n.d.—not detected Polymer Compositions Comprising a Filler Polymer compositions were prepared by combining the polymers obtained in examples 1 to 10 above or commercially available polymer CB25 with the constituents listed below in Table 4 (for polymers obtained in examples 1, 2 and 3), Table 5 (for polymers obtained in examples 4, 5, 6 and 7 or CB25) and Table 6 (for polymers obtained in examples 5, 8, 9 and 10 or CB25), in a "380 cc Banbury mixer (Labstation 350S from Brabender GmbH&Co KG)," following a two-stage mixing process. Stage 1: all components as indicated in tables 4 or 5 were mixed together for 7 minutes at 70 to 80 rpm, except for the components of the vulcanizing agent (i.e. sulfur, TBBS, and DPG) to form a stage 1 formulation. Stage 2: Subsequently, the vulcanizing agent was added and the mixture was mixed for additional 3 minutes at 40 rpm to give stage 2 formulations. Corresponding values for stage 1 and stage 2 formulations obtained from the components identified in table 6 are: 6 minutes at 90 rpm (stage 1) and 3 minutes at 50 rpm (stage 2), respectively. Mooney values were determined for each of these compositions ("stage 2 formulation") and are indicated in tables 8 and 10 below as "Compound Mooney" values. Values for the compositions addressed in tables 4 and 6 were each determined after sample preparation by the same operator on the same day. Likewise, Compound Mooney values for composition 4 and 5 (table 5) were determined after sample preparation by the same operator on one day, and Compound Mooney values for compositions 6, 7 and CB25 were also determined after sample preparation by the same operator on the same day. After preparation of stage 2 formulations, vulcanization was started by heating the stage 2 formulations at 160° C. for 20 minutes.

TABLE 4

Polymer Compositions 1, 2 and 3 using polymers obtained in examples 1, 2 and 3, respectively

| Components | | Amount (phr)[n] |
|---|---|---|
| SSBR (solution made styrene butadiene copolymer) | VSL5025-OHM[m] | 60.0 |
| Polymer 1, 2 or 3 (High cis-polybutadiene) | | 40.0 |
| Precipitated silica | Ultrasil 7000GR[f] | 80.0 |
| Silane | NXT[f,i] | 9.7 |
| Stearic acid[j] | | 1.0 |
| Stabilizer system: | | |
| Ozone protecting wax | Antilux 654[h] | 1.5 |
| Antiozonant | Dusantox[g] 6PPD | 2.0 |
| Zinc oxide[k] | | 2.5 |
| Softener (Oil) | TDAE[e] | 20.0 |
| Sulfur[d,l] | | 1.4 |
| TBBS[b,d] | | 1.5 |
| DPG[c,d] | | 1.5 |

[a] 2 stage mixing, Brabender 350S, Internal Banbury mixer
[b] N-t-butyl-2-benzothiazolsulfenamide, Santocure-TBBS, Flexsys Inc.
[c] Diphenylguanidine, Vulkacit D, Lanxess AG
[d] Second stage (curing system)
[e] VivaTec 500, Hansen & Rosenthal KG
[f] Evonic AG
[g] N-(1,3-dimethylbutyl)-N'-phenyl-1,4-benzenediamine, Duslo a.s.
[h] Light & ozone protective wax, Rhein Chemie Rheinau GmbH
[i] Momentive
[j] Cognis GmbH
[k] Grillo-Zinkoxid GmbH
[l] Solvay AG
[m] Lanxess AG
[n] Based on sum weight of the styrene butadiene copolymer and elastomeric diene polymer

TABLE 5

Polymer Compositions 4, 5, 6, 7 and CB25_silica using polymers obtained in examples 4, 5, 6 and 7 or CB25, respectively

| Components | | Amount (phr)[n] |
|---|---|---|
| SSBR (solution made styrene butadiene copolymer) | ZA28-X1Sprintan(R) SLR-4602 - Schkopau[m] | 60.0 |
| Polymer 4, 5, 6, 7 or CB25 (High cis-polybutadiene) | | 40.0 |
| Precipitated silica | Ultrasil 7000GR[f] | 80.0 |
| Silane | Si 75[f,i] | 6.9 |
| Stearic acid[j] | | 1.0 |
| Stabilizer system: | | |
| Ozone protecting wax | Antilux 654[h] | 1.5 |
| Antiozonant | Dusantox[g] 6PPD | 2.0 |
| Zinc oxide[k] | | 2.5 |
| Softener (Oil) | TDAE[e] | 20.0 |
| Sulfur[d,l] | | 1.4 |
| TBBS[b,d] | | 1.5 |
| DPG[c,d] | | 1.5 |

[a] 2 stage mixing, Brabender 350S, Internal Banbury mixer
[b] N-t-butyl-2-benzothiazolsulfenamide, Santocure-TBBS, Flexsys Inc.
[c] Diphenylguanidine, Vulkacit D, Lanxess AG
[d] Second stage (curing system)
[e] VivaTec 500, Hansen & Rosenthal KG
[f] Evonic AG
[g] N-(1,3-dimethylbutyl)-N'-phenyl-1,4-benzenediamine, Duslo a.s.
[h] Light & ozone protective wax, Rhein Chemie Rheinau GmbH
[i] Bis(triethoxysilylpropyl)disulfan, sulfur equivalents per molecule: 2.35
[j] Cognis GmbH
[k] Grillo-Zinkoxid GmbH
[l] Solvay AG
[m] Styron Deutschland GmbH
[n] Based on sum weight of the styrene butadiene copolymer and elastomeric diene polymer

TABLE 6

Polymer Compositions 5A, 8, 9, 10 and CB25_carbon black using polymers obtained in examples 5, 8, 9 and 10 or CB25, respectively

| Components | | Amount (phr)[h] |
|---|---|---|
| Polymer 5, 8, 9, 10 or CB25 (High cis-polybutadiene) | | 100 |
| IRB 7 | international ref. carbon black, Sid Richardson | 50 |
| Stearic acid[e] | | 1.5 |
| Zinc Oxide[f] | | 3.0 |
| Softener (Aromatic Oil) | TDAE[d] | 5.0 |
| Sulfur[c,g] | | 1.75 |
| TBBS[c,d] | | 1.0 |

[a] 2 stage mixing, Brabender 350S, Internal Banbury mixer
[b] N-t-butyl-2-benzothiazolsulfenamide, Santocure-TBBS, Flexsys Inc.
[c] Second stage (curing system)
[d] VivaTec 500, Hansen & Rosenthal KG
[e] Cognis GmbH
[f] Grillo-Zinkoxid GmbH
[g] Solvay AG
[h] Based on weight of the elastomeric diene polymer The compositions thus prepared were evaluated after vulcanization to give properties as disclosed in tables 9 and 11.

TABLE 8

Compound Mooney of Polymer compositions ("stage 2 formulations")

| Polymer Composition | Compound Mooney [Mu] | Compound Mooney - Mooney Polymer |
|---|---|---|
| 1 | 54.2 | 10.6 |
| 2 | 47.6 | 2.1 |
| 3 | 47.5 | −0.1 |
| 4 | 51.2 | 9.4 |
| 5 | 74.6 | 31.0 |
| 6 | 78.9 | 38.3 |
| 7 | 91.2 | 44.6 |
| CB25 | 95.3 | 49.3 |

TABLE 9

Silica Containing Polymer Vulcanizate Composition Properties
("Stage 2 formulations" after vulcanization)

| Example | DIN Abrasion 0.5 kg load [mm] | Elongation at Break [%] | Tensile Strength [MPa] | Modulus 300 [MPa] | Tan δ at −10° C. | Tan δ at 0° C. | Tan δ at 60° C. |
|---|---|---|---|---|---|---|---|
| 4 | 86 | 410 | 17.8 | 11.0 | 0.286 | 0.229 | 0.107 |
| 5 | 80 | 409 | 17.4 | 10.9 | 0.279 | 0.228 | 0.114 |
| 6 | 95 | 449 | 18.2 | 10.1 | 0.287 | 0.232 | 0.117 |
| 7 | 82 | 436 | 18.6 | 10.9 | 0.263 | 0.221 | 0.112 |
| CB25 | 95 | 400 | 18.2 | 11.1 | 0.255 | 0.225 | 0.116 |

TABLE 10

Compound Mooney of Polymer Compositions ("Stage 2 Formulations")

| Polymer Composition | Compound Mooney [Mu] | Compound Mooney − Mooney Polymer |
|---|---|---|
| 5A | 65.2 | 21.6 |
| CB25_carbon black | 73.9 | 28.1 |
| 8 | 62.5 | 21.3 |
| 9 | 62.5 | 20.7 |
| 10 | 61.6 | 21.6 |

TABLE 11

Carbon Black Containing Polymer Vulcanizate Composition Properties
("Stage 2 formulations" after vulcanization)

| Example | DIN Abrasion 0.5 kg load [mm] | Elongation at Break [%] | Tensile Strength [MPa] | Modulus 300 [MPa] | Tan δ at −10° C. | Tan δ at 0° C. | Tan δ at 60° C. |
|---|---|---|---|---|---|---|---|
| 5A | 20 | 477 | 17.7 | 9.5 | 0.149 | 0.142 | 0.117 |
| CB25_Carbon black | 20 | 470 | 19.8 | 11.1 | 0.139 | 0.133 | 0.112 |
| 8 | 20 | 453 | 16.9 | 9.7 | 0.148 | 0.141 | 0.120 |
| 9 | 20 | 415 | 15.5 | 10.0 | 0.147 | 0.142 | 0.118 |
| 10 | 19 | 468 | 17.1 | 9.6 | 0.151 | 0.146 | 0.121 |

Polymer compositions 2 and 3 show lower Compound Mooney values as compared to polymer composition 1 (table 8). Since the mooney viscosity values of the corresponding polymers that were used for the preparation of polymer compositions 1, 2 and 3 are similar (see table 2), the difference of "Compound Mooney" (indicated in Table 8) and "Mooney Polymer" (indicated as Mooney viscosity [MU] in table 2), i.e. "Compound Mooney—Mooney Polymer" (herein also referred to as "delta Mooney") is lower for polymer compositions 2 and 3 as compared to polymer composition 1 that makes use of the linear, non-branched reference polymer 1.

Likewise, table 8 reveals lower delta Mooney values for polymer compositions 4, 5, 6 and 7 as compared to comparative composition CB25. At the same time, the examples according to the invention show comparable or even better vulcanizate composition properties as expressed in table 9.

Similarly, carbon black containing polymer compositions 5A, 8, 9 and 10 show lower delta Mooney values as compared to reference composition CB25 Carbon black (table 10), and vulcanizate composition properties were again found to be comparable or better for the examples according to the invention (table 11).

The process of the invention yields polymers with improved processing properties. Without wishing to be bound by theory, the inventors believe that the improved processing behavior is the result of a specific branching between the polymer chains. The experiments show, that the unique polymer properties are the result of first adding one or more alkoxysilane compounds and then, subsequently, adding a thio compound to the reaction mixture derived from process step i).

The invention claimed is:

1. Process for producing a diene polymer, the process comprising the following steps in this order:

i) polymerizing one or more diene monomers in the presence of a catalyst composition to give a reaction mixture; wherein the catalyst composition comprises one or more of a carboxylate, an alkyl phosphate, an alkyl phosphite, an alcoholate, an amide and a hydrocarbyl compound of a rare earth element having an atomic number of 57 to 71 in the periodic table, and at least one activator compound, or a reaction product of the at least one activator compound and the carboxylate, alkyl phosphate, alkyl phosphite, alcoholate, amide and/or hydrocarbyl compound of the rare earth element;

ii) adding to the reaction mixture one or more alkoxysilane compounds selected from the compounds represented by the following formulae (A1), (A2), (A3), (A4) and (A5):

$$((R^1O)_q(R^2)_rSi)_s \quad (A1)$$

wherein in formula (A1): Si is silicon and O is oxygen;
s is an integer selected from 1 and 2;
with the proviso that if s is 1, then q is an integer selected from 2, 3 and 4; r is an integer selected from 0, 1 and 2; and q+r=4;

and if s is 2, then q is an integer selected from 1, 2 and 3;
r is an integer selected from 0, 1 and 2; and q+r=3;

$$((R^3O)_t(R^4)_uSi)_2O \qquad (A2)$$

wherein in formula (A2): Si and O are as defined above;
t is an integer selected from 1, 2 and 3;
u is an integer selected from 0, 1 and 2;
and t+u=3;

$$(R^5O)_w(R^6)_xSi\text{—}R^7\text{—}S\text{—}SiR^8{}_3 \qquad (A3)$$

wherein in formula (A3): Si and O are as defined above, and S is sulfur;
w is an integer selected from 2 and 3;
x is an integer selected from 0 and 1;
and w+x=3;

$$(R^9O)_y(R^{10})_zSi\text{—}R^{11}\text{—}N(SiR^{12}{}_3)_2 \qquad (A4)$$

wherein in formula (A4): Si and O are as defined above, and N is nitrogen;
y is an integer selected from 2 and 3;
z is an integer selected from 0 and 1;
and y+z=3;

$$(Si(OR^{13})_3)_2(Si(OR^{14})_2)_p \qquad (A5)$$

wherein in formula (A5): Si and O are as defined above;
p is an integer selected from 1 to 10;
and wherein $R^1$, $R^2$, $R^3$, $R^4$, $R^5$, $R^6$, $R^8$, $R^9$, $R^{10}$, $R^{11}$, $R^{13}$ and $R^{14}$ in the above formulae (A1) to (A5) independently are selected from: ($C_6$-$C_{21}$) aryl, ($C_7$-$C_{22}$) alkylaryl and ($C_1$-$C_{16}$) alkyl; and $R^7$ and $R^{11}$ in formulae (A3) and (A4) independently are a divalent ($C_6$-$C_{21}$) aryl group, a divalent ($C_7$-$C_{22}$) alkylaryl group, or a divalent ($C_1$-$C_{16}$) alkylen group;
iii) adding $S_2Cl_2$, $SCl_2$, $S_2Br_2$, $SOBr_2$ or a mixture thereof to the reaction mixture; and
iv) optionally adding a protic agent to the reaction mixture so as to deactivate the catalyst.

2. The process according to claim 1, wherein the one or more diene monomer comprises at least one of 1,3-butadiene, isoprene, 1,3-pentadiene and 2,3-dimethyl-1,3-butadiene or a mixture thereof.

3. The process according to claim 1, wherein groups $R^1$, $R^2$, $R^3$, $R^4$, $R^5$, $R^6$, $R^8$, $R^9$, $R^{10}$, $R^{12}$, $R^{13}$ and $R^{14}$ in formulae (A1) to (A5) independently from each other are $C_{1-8}$ alkyl groups.

4. The process according to claim 1, wherein groups $R^1$, $R^3$, $R^5$, $R^9$, $R^{13}$ and $R^{14}$ in formulae (A1) to (A5) independently from each other are $C_{1-4}$ alkyl groups.

5. The process according to claim 1, wherein the rare earth element is one or more of lanthanum, praseodymium, cerium, neodymium, gadolinium and dysprosium.

6. The process according to claim 1, wherein the catalyst composition comprises a neodymium carboxylate.

7. The process according to claim 1, wherein the activator compound comprises dialkylaluminum hydride according to general formula (A6) and a Lewis acid:

$$R^{15}{}_2AlH \qquad (A6)$$

wherein both groups $R^{15}$ in formula (A6) independently from each other are $C_{1-10}$ alkyl groups.

8. The process according to claim 7, wherein the Lewis acid is an alkyl aluminum chloride selected from alkyl aluminum sesquichloride, dialkyl aluminum chloride and alkyl aluminum dichloride.

9. The process according to claim 1, wherein $S_2Cl_2$, $SCl_2$, $S_2Br_2$, $SOBr_2$ or the mixture thereof is added in an amount of less than 0.05 parts by weight based on 100 parts by weight of diene polymer.

10. The process according to claim 1, wherein the one or more alkoxysilane compounds are selected from the compounds represented by formulae (A1), (A2), (A3) and (A4).

11. The process according to claim 1, wherein the one or more alkoxysilane compounds are selected from the compounds represented by formulae (A1) and (A3).

12. The process according to claim 1, wherein the one or more alkoxysilane compounds are selected from $(CH_3O)_4Si$, $((CH_3O)_3Si)_2$ and $(CH_3O)_3Si\text{—}(CH_2)_3\text{—}S\text{—}Si(CH_3)_2C(CH_3)_3$.

13. The process according to claim 1, further comprising the additional step v): adding oil and/or a filler.

14. The process according to claim 1, further comprising the additional step vi): adding a vulcanizing agent and vulcanizing the polymer.

* * * * *